US007107316B2

(12) United States Patent
Brown et al.

(10) Patent No.: US 7,107,316 B2
(45) Date of Patent: Sep. 12, 2006

(54) CONTROLLING THROUGHPUT OF MESSAGE REQUESTS IN A MESSAGING SYSTEM

(75) Inventors: Michael Wayne Brown, Georgetown, TX (US); Stephen B. Boston, Cedar Park, TX (US); Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 09/956,765

(22) Filed: Sep. 20, 2001

(65) Prior Publication Data

US 2003/0055908 A1    Mar. 20, 2003

(51) Int. Cl.
*G06F 15/16* (2006.01)
(52) U.S. Cl. ..................... 709/207; 709/240
(58) Field of Classification Search ............... 709/207
See application file for complete search history.

(56) References Cited

U.S. PATENT DOCUMENTS

| | | | | |
|---|---|---|---|---|
| 4,972,461 A | * | 11/1990 | Brown et al. ............... 379/67 |
| 5,493,692 A | * | 2/1996 | Theimer et al. ........... 455/26.1 |
| 5,627,978 A | | 5/1997 | Altom et al. ............... 395/330 |
| 6,072,942 A | * | 6/2000 | Stockwell et al. ....... 395/200.36 |
| 6,094,681 A | * | 7/2000 | Shaffer et al. .............. 709/224 |
| 6,138,145 A | | 10/2000 | Kawanaka .................. 709/204 |
| 6,147,977 A | * | 11/2000 | Thro et al. .................. 370/265 |
| 6,216,165 B1 | * | 4/2001 | Woltz et al. ................ 709/232 |
| 6,411,947 B1 | * | 6/2002 | Rice et al. .................... 706/47 |
| 6,640,230 B1 | * | 10/2003 | Alexander et al. ........... 707/10 |
| 6,714,967 B1 | * | 3/2004 | Horvitz ...................... 709/206 |
| 6,768,790 B1 | * | 7/2004 | Manduley et al. ....... 379/88.13 |
| 2003/0046421 A1 | * | 3/2003 | Horvitz et al. .............. 709/238 |

OTHER PUBLICATIONS

60/255,016—provisional application for U.S. 2003/0046421.*
IBM, Tracking User Availability for Participation in Messaging Sessions, Michael Wayne Brown, et al., 42 pages.
IBM, Specifying Monitored User Participation in Messaging Sessions, Michael Wayne Brown, et al., 56 pages.

* cited by examiner

*Primary Examiner*—John B. Walsh
(74) *Attorney, Agent, or Firm*—Marilyn S. Dawkins; Amy J. Pattillo

(57) ABSTRACT

A method, system, and program for controlling throughput of message requests in a messaging system is provided. A message request is received from a sending user. A priority requirement is determined for the message request according to priority settings designated by a receiving user for whom the message request is intended. Output of the message request to the receiving user is adjusted according to whether the message request meets the priority requirement, such that throughput of the message request to the receiving user is controlled. In addition, output of a message indicating that the receiving user is available is adjusted according to said priority requirement.

27 Claims, 9 Drawing Sheets

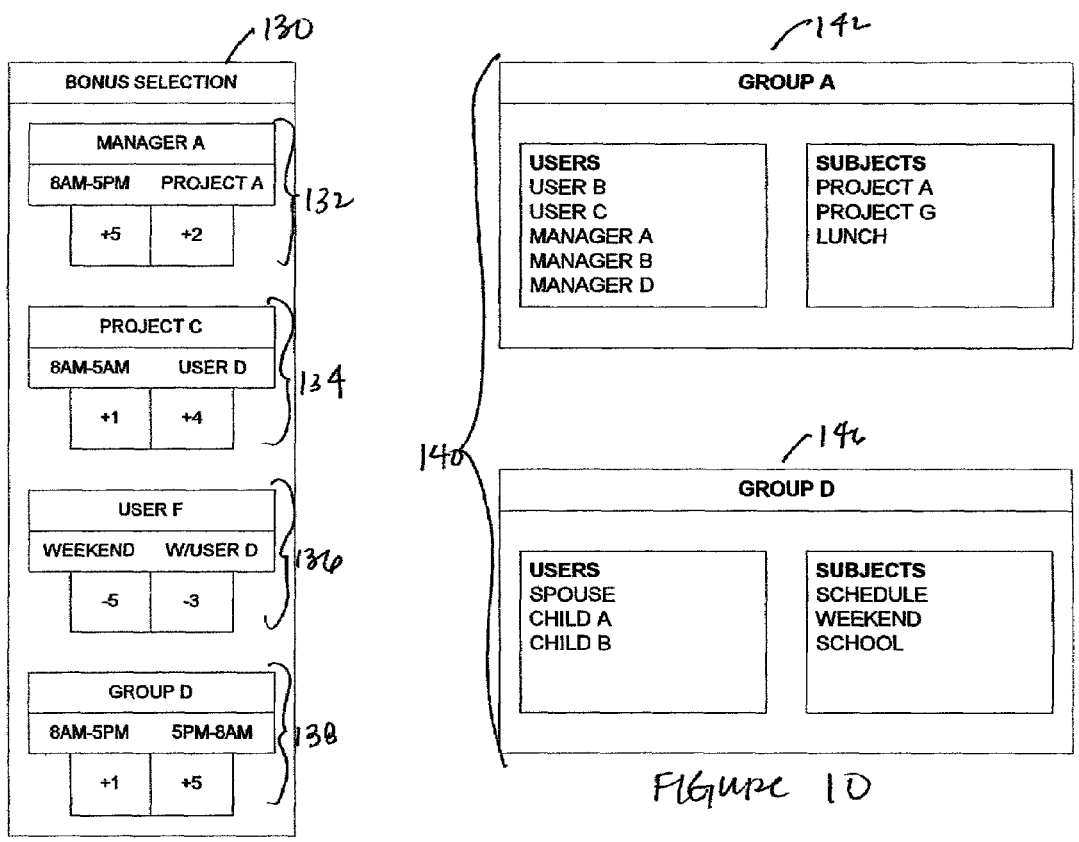

150

| AWAY MESSAGE PRIORITY | INSTANT MESSAGING ~151 |
|---|---|
| GENERAL | |
| 10<br>9<br>8 | I CAN BE REACHED AT NUMBER |
| 7<br>6<br>5 | I WILL BE AVAILABLE AT TIME — 153 |
| 4<br>3<br>2<br>1<br>0 | I'M NOT AVAILABLE RIGHT NOW. |
| USER | |
| USER F<br>MANAGER A<br>SPOUSE<br>GROUP A | PLEASE DO NOT CONTACT ME<br>I CAN BE REACHED AT NUMBER<br>I AM UNAVAILABLE, BUT MISS YOU<br>I WILL BE AVAILABLE AT TIME |
| SUBJECT | |
| PROJECT A<br>LUNCH | I WILL DISCUSS PROJECT A AT 5PM<br>I HAVE PLANS FOR LUNCH TODAY |
| TIME | |
| 1PM-2PM | DO NOT DISTURB EXCEPT FOR EMERGENCY |

152 — general priority levels
154 — user list
156 — subject list
158 — time list

FIGURE 11

| WINDOW TREATMENT PRIORITY | INSTANT MESSAGING |

GENERAL

| | |
|---|---|
| 10 | AUDIBLE ALERT D WITH REGULAR WINDOW |
| 9 | REGULAR WINDOW |
| 8 | |
| 7 | REGULAR MESSAGE WINDOW WITH ICONIZED TEXT (30% TRANSPARENT) |
| 6 | |
| 5 | ONE-LINE AT BOTTOM OF OPEN WINDOW FONT STYLE 4 |
| 4 | |
| 3 | |
| 2 | STORE FOR LATER |
| 1 | |
| 0 | |

USER

| | |
|---|---|
| USER F | STORE FOR LATER |
| MANAGER A (9AM-5PM) | REGULAR WINDOW, 20% TRANSPARENT, FONT STYLE 2 |
| SPOUSE | REGULAR WINDOW AND AUDIBLE ALERT A |

SUBJECT

| | |
|---|---|
| PROJECT A | REGULAR WINDOW WITH AUDIBLE ALERT B |
| MOVIES | ONE-LINE AT BOTTOM OF OPEN WINDOW |

TIME

| | |
|---|---|
| 1PM-2PM | STORE FOR LATER |

FIGURE 12

CONTROLLING THROUGHPUT OF MESSAGE REQUESTS IN A MESSAGING SYSTEM

CROSS-REFERENCE TO RELATED APPLICATIONS

The present application is related to the following co-pending applications, incorporated herein by reference:
(1) U.S. patent application Ser. No. 09/956,766; and
(2) U.S. patent application Ser. No. 09/957,277.

BACKGROUND OF THE INVENTION

1. Technical Field

The present invention relates in general to electronic communications and, in particular, to controlling throughput of message requests in a messaging system. Still more particularly, the present invention relates to specifying output of a message request according to a priority requirement set by a user receiving the message request.

2. Description of the Related Art

As the Internet and telephony expand, the ease of communications between individuals in different locations continues to expand as well. One type of electronic communication is supported by messaging which includes the use of computer systems and data communication equipment to convey messages from one person to another, as by e-mail, voice mail, unified messaging, instant messaging, or fax.

While e-mail has already expanded into nearly every facet of the business world, other types of messaging continue to forge into use. For example, instant messaging systems are typically utilized in the context of an Internet-supported application that transfers text between multiple Internet users in real time.

In particular, the Internet Relay Chat (IRC) service is one example of instant messaging that enables an Internet user to participate in an on-line conversation in real time with other users. An IRC channel, maintained by an IRC server, transmits the text typed by each user who has joined the channel to the other users who have joined the channel. An IRC client shows the names of the currently active channels, enables the user to join a channel, and then displays the other channel participant's words on individual lines so that the user can respond.

Similar to IRC, chat rooms are often available through on-line services and provide a data communication channel that links computers and permits users to converse by sending text messages to one another in real-time.

Some messaging systems allow users sending messages to assign a priority level, such a high, medium, or low, to a message. However, a limitation of such systems is that the priority level is typically only displayed with the message when received by another user utilizing the same software utilized to create the message. Further, a limitation of such systems is that the message prioritization is set only by the user sending the message. Further, the user is still typically interrupted either by a visual or audible cue whether the message is low priority or high priority.

As instant messaging systems and telephony based messaging systems expand, the number of unwanted and often unnecessary daily intrusions increases. Other users are enabled to see when another user has logged on and send instant messaging requests that take up screen space and are both audibly and visibly intrusive.

Some messaging systems enable a user to select from among several "away messages" that are transmitted automatically in response to a another user's request to talk. With an "away message" set, a user may continue working while logged on, however other users are informed that the user is not available. With telephony devices, a user is provided with an answering service, rather than having to answer a call.

However, messaging systems and telephony devices are limited in that while a particular user may indicate to other requesting users that the particular user is unavailable, in order for that user to utilize a network connection, the user is still intruded upon by the requests to talk. For example, in an instant messaging system, an automatic "not available" is transmitted, but either all requests still come through or no requests come through. Similarly, a ringer may be turned off on a telephony device such that the caller ID is displayed, but then a user is not alerted to any calls.

A further disadvantage of "away messages" is that a single message is displayed to all users requesting to talk. However, it would be advantageous to tailor "away messages" depending on the person receiving the message such that a spouse receives one message while a boss receives another.

In addition, whether a user is designated as away or not, most messaging systems only offer one format for notifying users of a request to talk. Such requests often utilize an unsatisfactory amount of screen space and may include unwanted audible prompts.

In view of the foregoing, it would be advantageous to provide a method, system, and program for controlling the throughput of message requests through a messaging system such that a user may specify which message requests are output and how the message request is output. Further, it would be advantageous to provide a method, system, and program for automatically specifying the response message transmitted to the user requesting to chat.

SUMMARY OF THE INVENTION

In view of the foregoing, it is therefore an object of the present invention to provide an improved method, system and program for performing electronic communications.

It is another object of the present invention to provide a method, system and program for controlling throughput of message requests in a messaging system.

It is yet another object of the present invention to provide a method, system and program for specifying output of a message request according to a priority requirement set by a user receiving the message request.

According to one object of the present invention, a message request is received from a sending user. A priority requirement is determined for the message request according to priority settings designated by a receiving user for whom the message request is intended. Output of the message request to the receiving user is adjusted according to whether the message request meets the priority requirement, such that throughput of the message request to the receiving user is controlled.

According to another aspect of the present invention, a message request is received from a sending user. A priority requirement is determined for the message request according to priority settings designated by a receiving user for whom the message request is intended. Output of a response to the sending user is adjusted according to the priority requirement to indicate that the receiving user is unavailable, such that the response to the messaging request is automatically specified.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 illustrates a block diagram of priority categories within a priority settings database in accordance with the method, system, and program of the present invention;

FIG. 8 illustrates a chart illustrative of one embodiment of a calendar in accordance with the method, system, and program of the present invention;

FIG. 9 depicts a graphical representation of a bonus priority setting window in accordance with the method, system, and program of the present invention;

FIG. 10 illustrates a block diagram of one embodiment of users and subjects grouped in accordance with the method, system, and program of the present invention;

FIG. 11 depicts a graphical representation of an away message setting window in accordance with the method, system, and program of the present invention;

FIG. 12 illustrates a graphical representation of a window treatment display window in accordance with the method, system, and program of the present invention;

DETAILED DESCRIPTION OF THE PREFERRED EMBODIMENT

Figure 1:
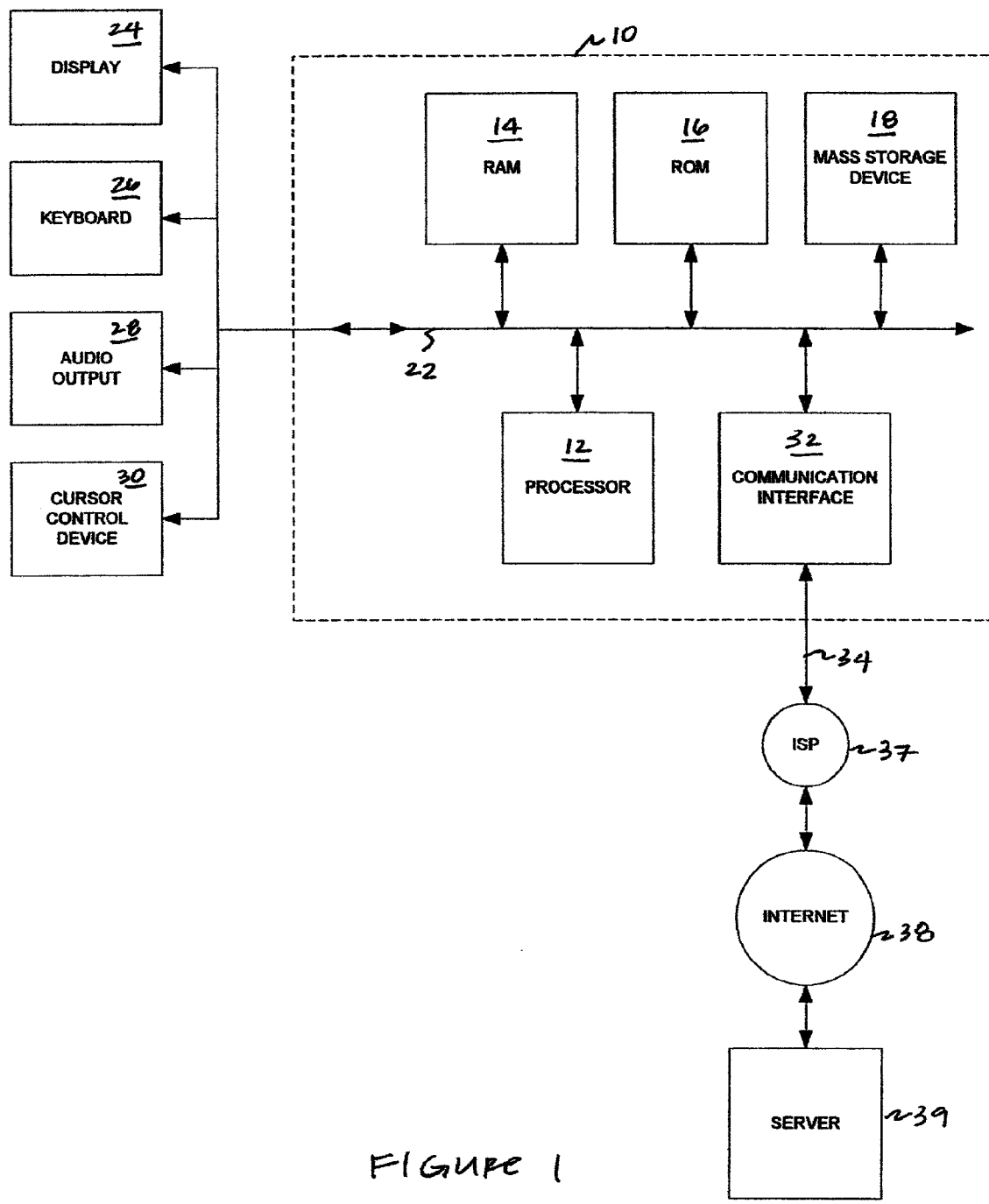
FIG. 1 depicts one embodiment of a computer system with which the method, system and program of the present invention may advantageously be utilized.

A method, system and program for controlling and specifying throughput of message requests in a messaging system are provided. A "messaging session" preferably includes, but is not limited to, any combination of voice, graphical, video, and/or text messages, instant and/or delayed, transmitted between multiple users via a network. Messaging sessions may include use of chat rooms, instant messages, e-mail, IRC, conference calling and other network methods of providing a channel for users to communicate within. Further, messaging sessions may include communications such as voice, video, and text transmissions between multiple telephony devices.

A "message request" may include, but is not limited to, a request for a user to join a chat session, a request for a user to participate in an instant messaging session, a request for a user to join a telephone conversation, and other requests for user to participate in a messaging session. In particular, a message request may be transmitted to a receiving user according to the receiving user's user identification (ID), screen name, telephone number, e-mail address, network location, or other identifier by which a message request may be routed to the intended receiving user.

In addition, a messaging request may include, but is not limited to, text, graphics, video, or audio, that a sending user submits for transmission to a receiving user. For example, a sending user may request transmission of an e-mail to another user where that e-mail is the message request. Further, notification of the message request may be output to the receiving user indicating the user ID, screen name, caller ID, email address, or other identifier for the sending user.

Preferably, for purposes of the present invention, a sending user is the user initiating a message request and providing an identifier for an intended receiving user. A receiving user is the user to whom a message request is transmitted. In particular, the priority settings for the receiving user are utilized to specify throughput of the message request to the receiving user.

A "priority" may be a numerical, alphanumeric, or other value that a receiving user assigns to message entry variables. In particular, a receiving user may assign a priority generally for all message requests received. In addition, a receiving user may assign a priority according to user, subject, schedule, group, and other associated message entry variables. Further, priority may be determined for all content within a window, sections of a messaging session, or line by line.

In addition, a sending user may assign a priority value to a message request, where the priority value is a numerical, alphanumeric or other value that indicates the urgency or other characteristic of a particular message request.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

The present invention may be executed in a variety of systems, including a variety of computing systems and electronic devices under a number of different operating systems. In one embodiment of the present invention, the messaging system is a portable computing system such as a notebook computer, a palmtop computer, a personal digital assistant, a telephone or other electronic computing system that may also incorporate communications features that provide for telephony, enhanced telephony, messaging and information services. However, the messaging system may also be, for example, a desktop computer, a network computer, a midrange computer, a server system or a mainframe computer. Therefore, in general, the present invention is preferably executed in a computer system that performs computing tasks such as manipulating data in storage that is accessible to the computer system. In addition, the computer system preferably includes at least one output device and at least one input device.

Referring now to the drawings and in particular to FIG. 1, there is depicted one embodiment of a computer system with which the method, system and program of the present invention may advantageously be utilized. Computer system 10 comprises a bus 22 or other communication device for communicating information within computer system 10, and at least one processing device such as processor 12, coupled to bus 22 for processing information. Bus 22 preferably includes low-latency and high-latency paths that are connected by bridges and controlled within computer system 10 by multiple bus controllers.

Processor 12 may be a general-purpose processor such as IBM's PowerPC™ processor that, during normal operation, processes data under the control of operating system and application software stored in a dynamic storage device such as random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowcharts of FIGS. 16, 17, and others described herein. Alternatively, the steps of the present invention might be performed by specific hardware components that contain hardwire logic for performing the steps, or by any combination of programmed computer components and custom hardware components.

The present invention may be provided as a computer program product, included on a machine-readable medium having stored thereon the machine executable instructions used to program computer system 10 to perform a process according to the present invention. The term "machine-readable medium" as used herein includes any medium that participates in providing instructions to processor 12 or other components of computer system 10 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patters of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of nonvolatile media is storage device 18. Volatile media includes dynamic memory such as RAM 14. Transmission media includes coaxial cables, copper wire or fiber optics, including the wires that comprise bus 22. Transmission media can also take the form of acoustic or light waves, such as those generated during radio wave or infrared data communications.

Moreover, the present invention may be downloaded as a computer program product, wherein the program instructions may be transferred from a remote computer such as a server 39 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide area network (WAN), or as depicted herein, directly to an Internet Service Provider (ISP) 37. In particular, network link 34 may provide wired and/or wireless network communications to one or more networks.

ISP 37 in turn provides data communication services through the Internet 38 or other network. Internet 38 may refer to the worldwide collection of networks and gateways that use a particular protocol, such as Transmission Control Protocol (TCP) and Internet Protocol (IP), to communicate with one another. ISP 37 and Internet 38 both use electrical, electromagnetic, or optical signals that carry digital data streams. The signals through the various networks and the signals on network link 34 and through communication interface 32, which carry the digital data to and from computer system 10, are exemplary forms of carrier waves transporting the information.

Further, multiple peripheral components may be added to computer system 10. For example, an audio output 28 is attached to bus 22 for controlling audio output through a speaker or other audio projection device. A display 24 is also attached to bus 22 for providing visual, tactile or other graphical representation formats. A keyboard 26 and cursor control device 30, such as a mouse, trackball, or cursor direction keys, are coupled to bus 22 as interfaces for user inputs to computer system 10. In alternate embodiments of the present invention, additional input and output peripheral components may be added.

Messaging Systems Context

Figure 2:
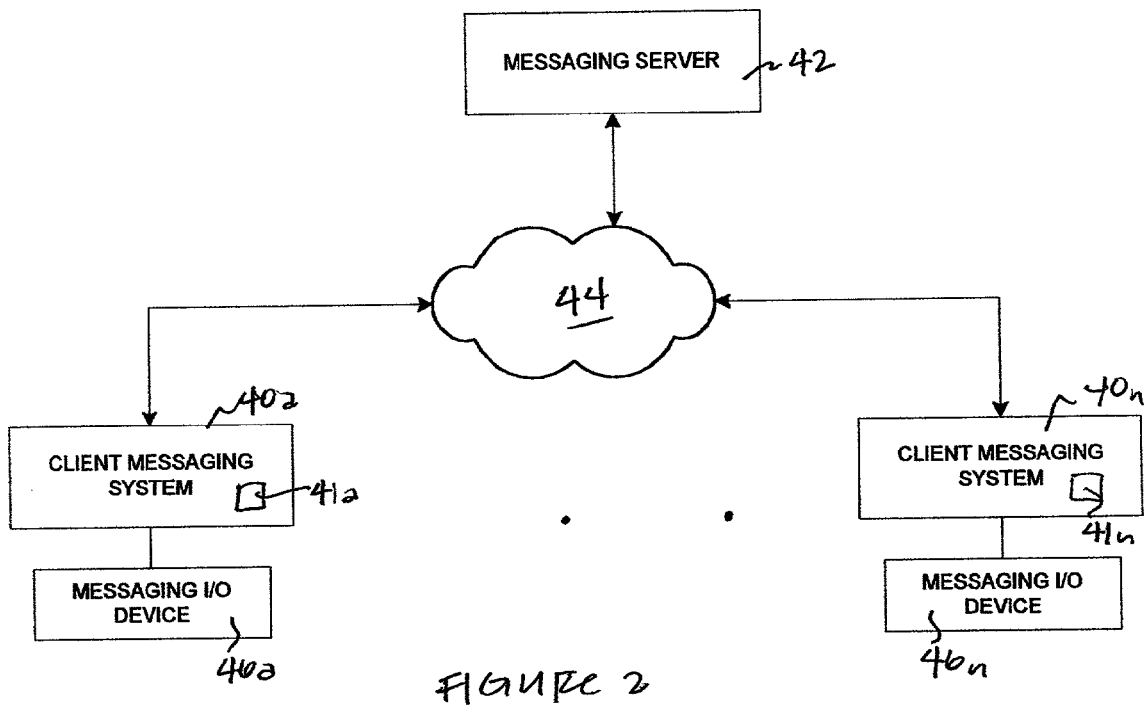
FIG. 2 illustrates a simplified block diagram of a client/server environment in which electronic messaging typically takes place in accordance with the method, system and program of the present invention.

With reference now to FIG. 2, there is depicted a simplified block diagram of a client/server environment in which electronic messaging typically takes place in accordance with the method, system and program of the present invention. The client/server environment is implemented within multiple network architectures. For example, the architecture of the World Wide Web (the Web) follows a traditional client/server modeled environment.

The terms "client" and "server" are used to refer to a computer's general role as a requester of data (the client) or provider of data (the server). In the Web environment, web browsers such as Netscape Navigator typically reside on client messaging systems 40a–40n and render Web documents (pages) served by at least one messaging server such as messaging server 42. Additionally, each of client messaging systems 40a–40n and messaging server 42 may function as both a "client" and a "server" and may be implemented utilizing a computer system such as computer system 10 of FIG. 1. Further, while the present invention is described with emphasis upon messaging server 42 controlling a messaging session, the present invention may also be performed by client messaging systems 40a–40n engaged in peer-to-peer network communications via a network 44.

The Web may refer to the total set of interlinked hypertext documents residing on servers all around the world. Network 44, such as the Internet, provides an infrastructure for transmitting these hypertext documents between client messaging systems 40a–40n and messaging server 42. Documents (pages) on the Web may be written in multiple languages, such as Hypertext Markup Language (HTML) or Extensible Markup Language (XML), and identified by Uniform Resource Indicators (URIs) that specify the particular messaging server 42 and pathname by which a file can be accessed, and then transmitted from messaging server 42 to an end user utilizing a protocol such as Hypertext Transfer Protocol (HTTP). Web pages may further include text, graphic images, movie files, and sounds as well as Java applets and other small embedded software programs that execute when the user activates them by clicking on a link.

Advantageously, in the present invention, a client enters a message via one of messaging input/output (I/O) devices 46a–46n for a messaging session at a client messaging system such as client messaging system 40a. The message entry is transmitted to messaging server 42. Messaging server 42 then distributes the message entry to the users participating in the messaging session via network 44.

In addition, in the present invention, messaging server 42 receives message requests from client messaging systems 40a–40n, determines priority requirements for throughput of each message request and then specifies throughput of each message request to client messaging systems 40a–40n according to whether priority requirements are met. In particular, each user sending a message request from one of client messaging systems 40a–40n may assign a priority value to the message request. Preferably, each user participating in a messaging session via messaging server 42 provides priority requirements for throughput of message requests to messaging server 42. Messaging server 42 then determines the priority requirement for the message request and whether the message request meets that priority requirement. Throughput of the message request from messaging server 42 to the receiving user is then specified according to whether the message request meets the priority requirement of the receiving user. In addition, a message transmitted from messaging server 42 to the sending user in response to the message request is specified according to the receiving user's priority requirements.

Advantageously, according to one embodiment of the present invention, the steps of entering a message request, receiving a response message, and other functions may be performed by an application executing in each of client messaging systems 40a–40n, such as client messaging applications 41a–41n. Further, in messaging systems controlled by messaging server 42 or in peer-to-peer communication, client messaging applications 41a–41n may control throughput of message requests at each of client messaging systems 40a–40n.

Figure 3:
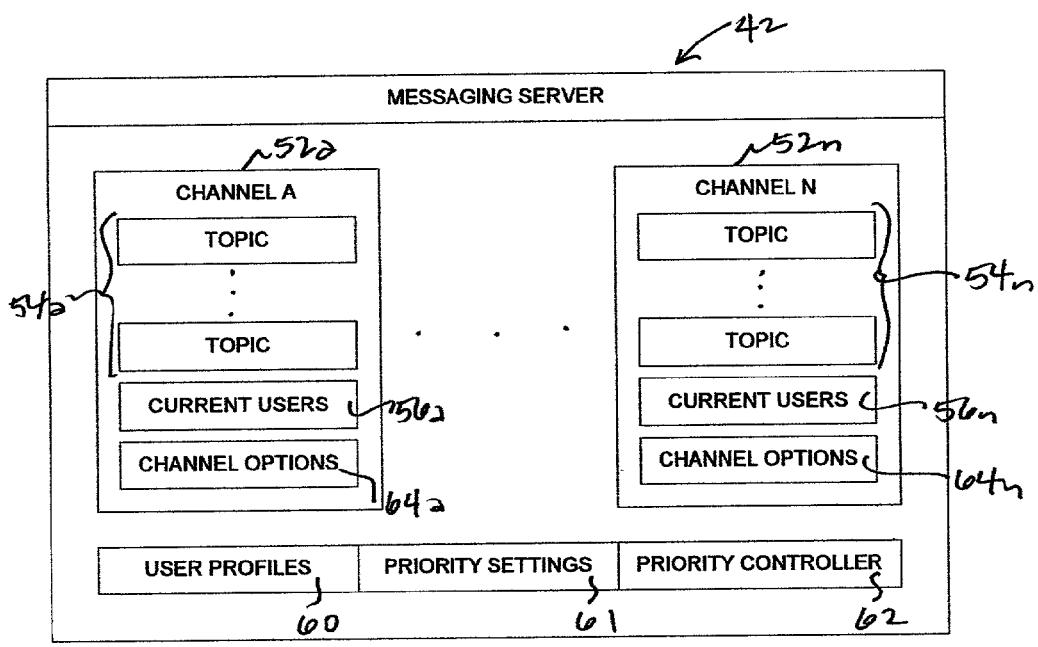
FIG. 3 depicts a block diagram of one embodiment of a messaging server in accordance with the method, system and program of the present invention.

Referring now to FIG. 3, there is illustrated a block diagram of one embodiment of a messaging server in accordance with the method, system and program of the present invention. As depicted, messaging server 42 includes a priority controller 62 that is provided to control the process steps of messaging server 42 as will be further described.

Messaging server 42 also includes multiple channels 52a–52n. Each of channels 52a–52n may represent a separate information path within messaging server 42 in which multiple users may participate in a messaging session. Messaging server 42 may have a defined number of channels 52a–52n or may allow users to create new channels as needed. Typically, when a sending user submits a message request, the request will open a new channel. In particular, channels provide network paths between multiple users for both voice and text communications. Each of channels 52a–52n may further include multiple distinguishable topics 54a–54n.

In addition, each of channels 52a–52n preferably includes a table of current users 56a–56n. As a user selects to participate in channels 52a–52n, the user's identification is added to the table of current users 56a–56n for that channel. Further, in the present invention, where a message request is transmitted to a user within one of channels 52a–52n, then the receiving user's identification is temporarily added to the table of current users 56a–56n.

Messaging server 42 includes a user profiles database 60 that includes profile information for each user, including, but not limited to, a user identification, a user history, a user schedule, and current participation recorded as the user participates in messaging sessions. The user identification stored in user profiles 60 during registration is utilized across multiple channels for identifying entries provided by that user.

A priority settings database 61 includes priority settings for each user. In particular, priority settings may include priority based on user ID, group ID, subject, topic, channel, schedule, and other user designated variables. Further, a user may designate variables for which bonuses may be added to priority values, both positive and negative. In addition, a user may designate priority for away messages such that an away message transmitted to the sending user is specified according to user priority. Further, priority may be designated for window treatment of message requests that pass through to the receiving user.

Priority controller 62 is advantageously a software application executing within messaging server 42 in order to control receipt of message requests, determine priority requirements for message requests, determine whether message requests meet the priority requirements, specify output of an away message to a sending user according to priority requirements, and specify window treatment and other output characteristics of the message request to the receiving user if the message request meets the priority requirements.

In particular, in setting a priority value for a message request, a sending user may set a fluctuating priority value that adjusts according to time or another variable. Priority controller 62 advantageously adjusts the fluctuating priority value according to time or another variable and determines whether the fluctuating priority value meets priority requirements.

Further, priority controller 62 advantageously converts priority values set within multiple messaging system formats. For example, a sending user may utilize messaging system format A while the receiving user utilizes messaging system format B. A directory of priority formats is advantageously accessible to priority controller 62 in order to convert a priority value under messaging system format A to one that is comparable with the priority scale for messaging system format B.

Further, according to one advantage of the present invention, priority settings 61 for a receiving user and priority controller 62 may also function within a client messaging system, such that the client messaging system controls the throughput of message requests rather than utilizing processing power of messaging server 42.

Channel options are included with each channel as depicted by channel options 64a–64n. Channel options preferably include authorization levels required to specify a priority value for a message request within a channel. Advantageously, channel options may be selected when a user requests a new channel. Alternatively, a user may select a channel based on the authorization levels set in the channel options for that channel. Moreover, a business or other network service provider may automatically set channel options for channels.

With reference now to FIG. 4, there is depicted a block diagram of priority categories within a priority settings database in accordance with the method, system, and program of the present invention. As illustrated, a priority settings database includes categories, but is not limited to, general priority 72, subject priority 74, user priority 76, time priority 78, bonuses 80, away messages 82, and window treatment 84.

According to one advantage of the present invention, each of general priority 72, subject priority 74, user priority 76, time priority 78, bonuses 80, away messages 82, and window treatment 84 may be further specified according to the type of message request being received, the device at which a receiving user is receiving the message request, and other device oriented preferences. For example, independent sets of priority requirements may be designated by a single user according to whether the message request is part of an instant messaging request, a telephony request, a chat room entry, or other messaging session requests. According to the type of messaging request, it may be further preferable to designate preferences to determine priority requirements for a total message request, sections of a message request, or line-by-line of a message request.

General priority 72 advantageously includes a general priority setting by a user for all message requests that do not fall within a specified priority. Further, a user may indicate that all message requests are to be filtered by general priority.

Subject priority 74 advantageously includes priority settings according to multiple subjects. Each subject setting may be further specified according to user, time and other variables, as will be further described. Preferably, a user may provide additional keywords and topics that may be included within a particular subject such that a subject priority will be recognized by the content of the message request in addition to any subject assigned to the message request.

User priority 76 advantageously includes priority settings according to user. Each user setting may be further specified according to subject, time, and other variables, as will be further described. Preferably a user may provide multiple identifiers for a single user including, but not limited to, a user ID, a screen name, a caller ID, and an e-mail address.

Time priority 78 advantageously includes priority settings according to time. Each time setting may be further specified according to subject, user, and other variables, as will be further described. Advantageously, a user may designate priority settings within a calendar that are stored in time priority 78.

Bonus priority 80 advantageously includes bonus settings according to user, channel, topic, subject, time or other criteria. Bonus settings are preferably positive or negative values that are utilized to adjust the priority value set by the sending user.

Away message priority 82 advantageously includes away message settings according to a priority value, user, subject, time, or other criteria. Away messages are designated such that a user may automatically respond to a message request, however the response is specified.

Window treatment priority 84 advantageously includes window treatment settings according to a priority value, user, subject, time, or other criteria. Window treatments are designated such that when a user receives a message request, the format in which the message request is received is specified.

Further, window treatment priority 84 includes the manner in which text, graphics, video, or audio, included with a message request or within a messaging session, is depicted. A user may designate font attributes, audio attributes, and shading attributes, to be assigned to message requests according to priority values. In particular, text, graphics, video, and audio may be specified by priority for an entire window, for a section of the window, or line-by-line.

Figure 5:
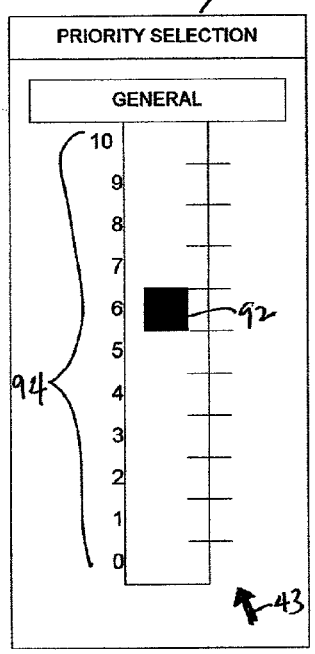
FIG. 5 depicts a graphical representation of a general priority setting window in accordance with the method, system, and program of the present invention.

Referring now to FIG. 5, there is depicted a graphical representation of a general priority setting window in accordance with the method, system, and program of the present invention. As illustrated, a general priority setting window 90 includes a sliding scale 94. In the present example, sliding scale 94 includes a priority scale from 0 to 10, where 0 is no priority and 10 is the largest priority. However, in alternate embodiments, alternate scales may be utilized and alternate graphical methods may be utilized to display selectable priority settings.

Advantageously, a user may select the position of scale bar 92 utilizing cursor 43 within sliding scale 94 in order to submit a general priority requirement. In the present example, scale bar 92 is set at a priority requirement of "6". By setting a general priority, a receiving user may indicate a priority requirement for all message requests not specified by other priority settings. Alternatively, a user may indicate a priority level that all message requests are required to at least match.

Figure 6:
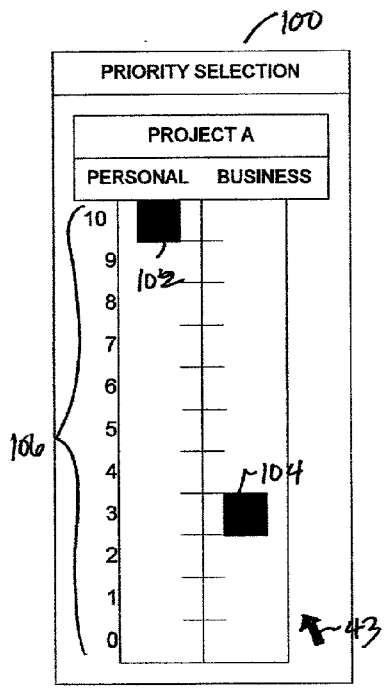
FIG. 6 illustrates a graphical representation of a subject priority setting window in accordance with the method, system, and program of the present invention.

With reference now to FIG. 6, there is illustrated a graphical representation of a subject priority setting window in accordance with the method, system, and program of the present invention. As depicted, a subject priority setting window 100 includes a sliding scale 106. In the present example, sliding scale 106 includes a priority scale from 0 to 10, where 0 is no priority and 10 is the largest priority. However, in alternate embodiments, alternate scales may be utilized and alternate graphical methods may be utilized to display selectable priority settings.

Advantageously, a user may indicate multiple levels of priority for a subject according to user, another subject, time, group, or other criteria. In the present example, subject priority setting window 100 is first associated with the subject "project A". Next, a priority requirement is individually set for additional subjects "personal" and "business". In an alternate embodiment of the present invention, alternate subcategories may be designated for each subject.

A user may select the position of a scale bar 102 within sliding scale 106 utilizing cursor 43 in order to submit a priority requirement for a message request with the subjects "project A" and "personal". In addition, a user may select the position of a scale bar 104 within sliding scale 106 in order to submit a priority requirement for a message request with the subjects "project A" and "business".

Figure 7:
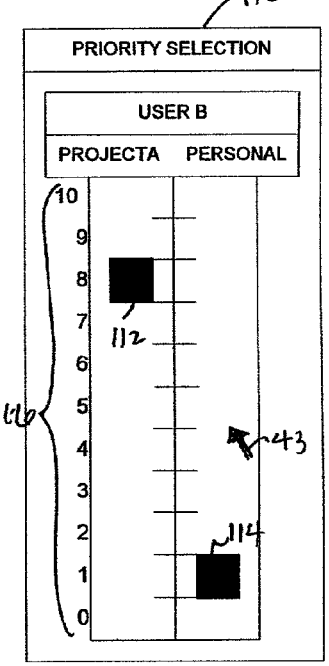
FIG. 7 depicts a graphical representation of a user priority setting window in accordance with the method, system, and program of the present invention.

Referring now to FIG. 7, there is depicted a graphical representation of a user priority setting window in accordance with the method, system, and program of the present invention. As illustrated, a user priority setting window 110 includes a sliding scale 116. In the present example, sliding scale 106 includes a priority scale from 0 to 10, where 0 is no priority and 10 is the largest priority. However, in alternate embodiments, alternate scales may be utilized and alternate graphical methods may be utilized to display selectable priority settings.

Advantageously, a user may indicate multiple levels of priority for a user according to another user, subject, time, group, or other criteria. In the present example, user priority setting window 110 is first associated with "user B". Next, a priority requirement is individually set for subjects "project A" and "personal". In an alternate embodiment of the present invention, alternate sub-categories may be selected.

A user may select the position of a scale bar 112 within sliding scale 116 utilizing cursor 43 in order to submit a priority requirement for a message request from "user B" where the subject is "project A". In addition, a user may select the position of a scale bar 114 within sliding scale 106 in order to submit a priority requirement for a message request from "user B" where the subject is "personal".

With reference now to FIG. 8, there is illustrated a chart illustrative of one embodiment of a calendar in accordance with the method, system, and program of the present invention. As depicted in the example, a calender 120 includes times 122, scheduled events 124, and priorities 126. Times 122 are preferably daily schedule times. Each of times 122 may have one of scheduled events 124 associated therewith. For example, at 7:00 AM, the associated scheduled event 124 is "driving to work".

Advantageously, a user may assign a priority requirement for each scheduled event as depicted by priorities 126. For example, the priority requirement associated with 7:00 AM is "7". In the present example, priorities 126 are associated with a time and scheduled event. However, in alternate embodiments, priorities 126 may be further associated with a user, a subject, another scheduled event, another time, a group, or other criteria.

Referring now to FIG. 9, there is depicted a graphical representation of a bonus priority setting window in accordance with the method, system, and program of the present invention. As illustrated, a bonus priority setting window 130 includes multiple bonus settings 132, 134, 136 and 138. Advantageously, each of bonus settings 132, 134, 136 and 138 is associated with a user, a subject, a channel, a topic, a time, a group, or other criteria.

Preferably, a user may select a positive or negative bonus that is applied to a priority value set for a message request by the sending user. In the present invention, priority values are described with particular reference to a scale of numbers from 0 to 10. Therefore, the bonus priorities set in the present example fall within the scale. However, in alternate embodiments, alternate scales and other forms of selecting priority may be utilized, wherein the bonus priorities will advantageously fall within the alternate scale.

In the present example, bonus settings 132 are selected for a user "manager A". If a message request is received from "manager A" between 8 AM and 5 PM, then five priority points are added to the priority value selected by "manager A" for the message request. In addition, at any time, if the subject of a message request is "project A", then two priority points are added to the priority value selected by "manager A" for the message request.

In addition, in the present example, bonus settings 134 are selected for subject "project C". If a message request is received with the subject "project C" between 8 AM and 5 PM, then one priority point is added to the priority value selected by the sending user for the message request. In addition, at any time, if the sending user of a message request for "project C" is "user D", then four priority points are added to the priority value selected by "user D" for the message request.

Further, in the present example, bonus settings 136 are selected for a user "user F". If a message request is received from "user F" on a weekend, then 5 priority points are subtracted from the priority value selected by "user F" for the message request. In addition, at any time, if a message request is received from "user F" and "user D" is already participating in the requested messaging session, then 3 priority points are subtracted from the priority value selected by "user F" for the message request.

Moreover, in the present example, bonus settings 138 are selected for "group D". If a message request is received that falls within "group D" between 8 AM and 5 PM, then one priority point is added to the priority value selected by the sending user. Or, if a message request is received that falls within "group D" between 5 PM and 8 AM, then five priority points are added to the priority value selected by the sending user.

With reference now to FIG. 10, there is depicted a block diagram of one embodiment of users and subjects grouped in accordance with the method, system, and program of the present invention. As illustrated, groups 140 include a group A 142 and group D 146. Advantageously, each group includes a set of users and a subset of subjects associated with the users. For example, group A includes users B and C and managers A, B, and D. A subset of group A then includes subjects "project A", "project G", and "lunch".

As a further advantage of the present invention, a user may select groups with sets and subsets where the sets include, but are not limited to, users, other groups, subjects, times and other criteria. In addition, the subsets may include, but are not limited to, users, other groups, subjects, times, and other criteria. By grouping, a user may associate users, groups, subjects, and times and more quickly assign a priority requirements and bonus settings to the grouping. In addition, groups may include only sets, or may include multiple levels of sets, subsets, and super subsets.

Referring now to FIG. 11, there is illustrated a graphical representation of an away message setting window in accordance with the method, system, and program of the present invention. As depicted, an away message setting window 150 includes general settings 152, user specified settings 154, subject specified settings 156, and time specified settings 158.

As illustrated, general settings 152 includes a scale of numbers from 0 to 10 which represent a priority value. Multiple dividers 153 have been placed to divide the scale into sections, wherein an away message is associated with each section. In particular, a user may specify, for example, that each priority value is associated with the priority requirement specified for a message request or the priority value set by the sending user for a message request.

In addition, as depicted in general settings 152, away messages may include variables that are to be adjusted according to a user's schedule or other criteria. In the example, the variables are a number that a user can be reached at and the time that the user will be available. A user may designate these values or advantageously a schedule and/or locator may provide information about communication availability of a user.

User specified settings 154, subject specified settings 156, and time specified settings 158 specify away messages according to the sending user, the subject of the message request and the time of the message request. Advantageously, a user may further designate which setting will override where there is overlap between settings for a particular message request or may request that a combination of away messages be transmitted according to each setting where there is an overlap between settings for a particular message request.

In particular, as depicted at reference numeral 151, the away message preferences are designated for message requests that are associated with an instant messaging system. In alternate embodiments, away message preferences may be designated for alternate types of messaging system message requests.

Referring now to FIG. 12, there is depicted a graphical representation of a window treatment display window in accordance with the method, system, and program of the present invention. As illustrated, a window treatment display window 160 includes general display priorities 162, user specified priorities 166, subject specified priorities 168, and time specified priorities 169.

As depicted, general display priorities 162 include a scale from 0 to 10 wherein multiple dividers 164 divide the scale into parts. Each of the parts includes a window treatment specification. Advantageously, general display priorities may be set to apply to message requests where further specifications have not been selected. The scale of numbers may correlate to the priority requirement for a message request that is being output to a user or may correlate to the priority value assigned to a message request by the sending user.

Advantageously, window treatment specifications may include the graphical size, placement, shape, shading, and other attributes for displaying a message request. For example, the transparency or other shading of the window may be specified, such as windows with 6–8 priority displayed at 30% transparency.

Further, the font attributes and other attributes of the contents of the message request may be specified. For example, windows with 4–5 priority are specified to utilize font style 4 for output of text. In addition, window treatment specifications may include audio, video and other graphical preferences.

Further, window treatment specifications may specify the parts of a message request that are output. For example, a window treatment specification within general display priorities 162 indicates that a user is to be notified of the message request through one line at the bottom of an open window where the user ID of the sending user is flashed.

User specified priorities 166, subject specified priorities 168, and time specified priorities 169 specify window treatment according to the sending user, the subject of the message request and the time of the message request. Advantageously, a user may further designate which setting will override where there is overlap between settings for a particular message request or may request that a combination of away messages be transmitted according to each setting where there is an overlap between settings for a particular message request.

In particular, as depicted at reference numeral 161, the window treatment preferences are designated for message requests that are associated with an instant messaging system. In alternate embodiments, away message preferences may be designated for alternate types of messaging system message requests.

Figure 13:
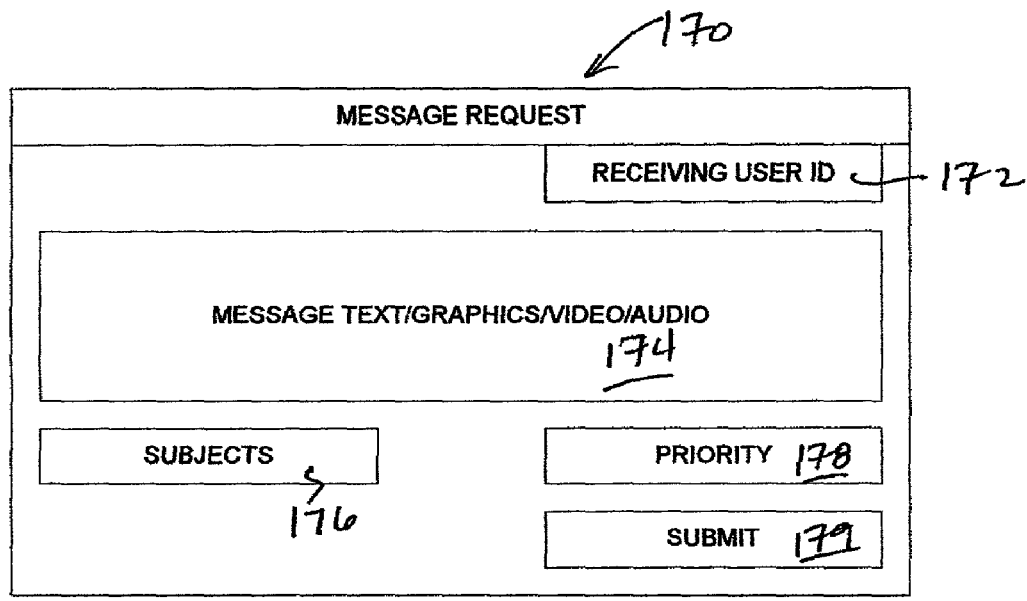
FIG. 13 depicts a graphical representation of a message request window in accordance with the method, system, and program of the present invention.

With reference now to FIG. 13, there is depicted a graphical representation of a message request window in accordance with the method, system, and program of the present invention. As illustrated message request window 170 includes a receiving user ID selection 172, a message area 174, a subject selection 176, a priority selection 178, and a submit selectable button 179. In alternate embodiments, alternate options may be provided to a user in message request window 170. In addition, message request window 170 may be adjusted dependent upon the hardware being utilized as a client messaging system.

Preferably, a sending user may specify at least one user ID or other identifier within receiving user ID selection 172. In addition, a sending user may include a message comprising text, graphics, video and/or audio within message area 174. Further, a sending user may specify at least one subject associated with the message request within subjects selection 176. Advantageously, a directory of subject may be accessible for selection by the sending user.

As an advantage of the present invention, a user may assign a priority value to the message request at priority selection 178. In one embodiment, the sending user may be enabled to access a listing of priority requirements set by the intended receiving user, such that the sending user may set the priority value with regard to the receiving user's priorities. In another embodiment, the sending user may access a history of responses from the receiving user in response to various priority levels. Further, the sending user may be barred from viewing priority information about the receiving user.

As a further advantage of the present invention, where a user ID is entered, a messaging server may distribute the message request to multiple devices accessible to the receiving user under the user ID. Therefore, in setting priority, a sending user may designate priority levels based on the device receiving the request.

Additionally, a user may set fluctuating priority levels that adjust according to criteria such as time. Additionally, fluctuating priority levels may be linked with a schedule such that as a schedule adjusts, the priority level may respond by adjusting.

A sending user submits the message request to the message server by selecting submit selectable button 179. Submit selectable button 179 may include, but is not limited to, a displayed selectable button, a audio initiated button, or a physical selectable button, depending on the user interface and client messaging system utilized.

Figure 14:
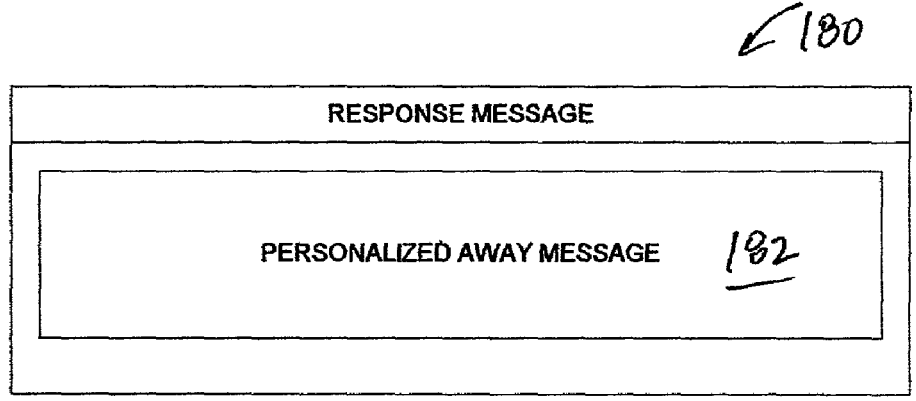
FIG. 14 illustrates a graphical representation of a response message window in accordance with the method, system, and program of the present invention.

Referring now to FIG. 14, there is illustrated a graphical representation of a response message window in accordance with the method, system, and program of the present invention. As depicted, response message window 180 includes a personalized away message display 182. Advantageously, if an away message is returned to a sending user, it is displayed within personalized away message 182. A sending user may set preferences for the attributes of response message window 180 and personalized away message display 182.

Figure 15:
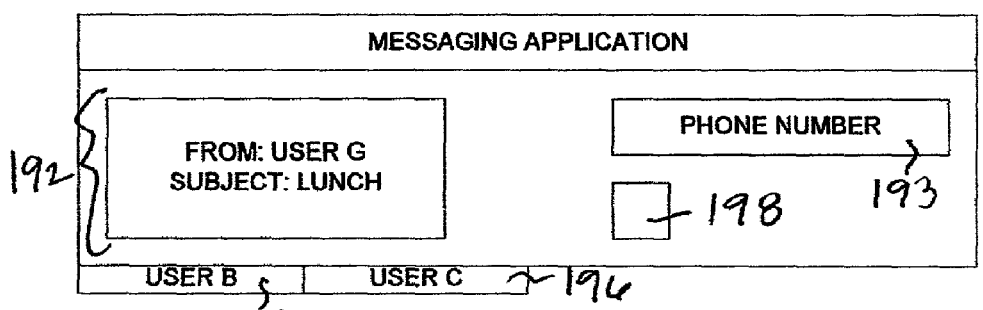
FIG. 15 depicts a graphical representation of a message request window received by a receiving user in accordance with the method, system, and program of the present invention.

With reference now to FIG. 15, there is depicted a graphical representation of a message request window received by a receiving user in accordance with the method, system, and program of the present invention. As illustrated, a message request window 190 includes message requests 192, 194, and 196.

Message request 192 illustrates a regular window message request from "user G" under the subject of lunch. In the present example, the content of a message included with the message request is minimized as a selectable icon 198. In response to a user selection with cursor 43 of selectable icon 198, message request window 190 will expand to depict the content of the message. Advantageously, the size and description of the content of the message may be accessed by the receiving user prior to expanding the content of the message such that a user may further specify what portion of the message request is viewed.

Device identifier 193 identifies the client message system from which "user G" submitted the message request. In the present example, "user G" submitted the message request from a telephony device.

In addition, message requests 194 and 196 are depicted within message request window 190 as one lines at the bottom of an open window. Further, only the user ID of the sending user of the message request is identified. While in the present embodiment the one line for message requests 194 and 196 is attached to the bottom of a regular message request window, in alternate embodiments, the one line may be attached to the bottom of windows that are not associated with message requests.

Figure 16:
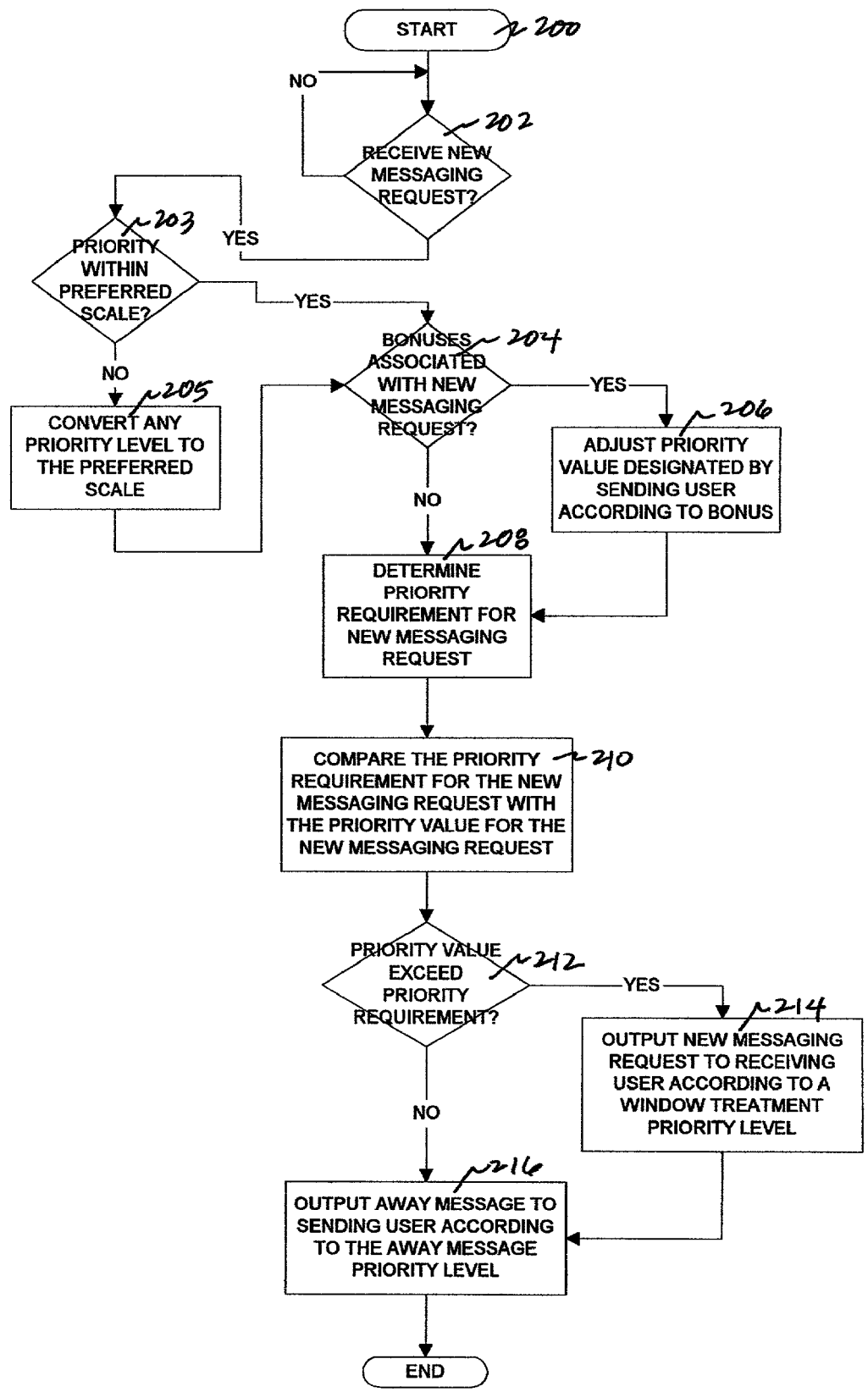
FIG. 16 illustrates a high level logic flowchart of a process and program for controlling throughput of message requests through a messaging system in accordance with the method, system, and program of the present invention.

Referring now to FIG. 16, there is depicted a high level logic flowchart of a process and program for controlling throughput of message requests through a messaging system in accordance with the method, system, and program of the present invention. As illustrated, the process starts at block 200 and thereafter proceeds to block 202. Block 202 depicts a determination as to whether or not a new message request has been received. If a new message request has not been received, then the process iterates at block 202. If a new message request has been received, then the process passes to block 203.

Block 203 illustrates a determination as to whether or not any priority value with the message request is in the preferred scale. If any priority value with the message request is in the preferred scale, then the process passes to block 204. If any priority value with the message request is not in the preferred scale, then the process passes to block 205. Block 205 depicts converting any priority level to the preferred scale, and the process passes to block 204. In particular, each messaging system may utilize an independent priority scale such that a conversion is necessary. Further, where no priority value is provided, or is not convertible, a priority value may be determined from a history of message requests from the user and responses thereto.

Block 204 depicts a determination as to whether there are any bonuses associated with the new messaging request. If there are not any bonuses associated with the new messaging request, then the process passes to block 208. If there are bonuses associated with the new messaging request, then the process passes to block 206. Block 206 illustrates adjusting the priority value designated by the sending user according to the bonus priority; and the process passes to block 208.

Block 208 illustrates determining the priority requirement for the new messaging request. The priority requirement is based on the receiving user's priority settings in general and by user, subject, time and other criteria. In particular, priority for a messaging request may be determined for all content within a messaging request, sections of content, or line-by-line. For example, in a chat room, each new entry within the chat room may be viewed as a message request with a priority value attach, and therefore a priority requirement may be determined for each new entry. Advantageously, by specifying priority requirements line-by-line in a chat room, only those portions of the conversation meeting a receiving user's priority requirements will be displayed. Further, advantageously, a user may monitor conversation within a chat room without appearing as a participating user.

Next, block 210 depicts comparing the priority requirement for the new messaging request with the priority value adjusted by any bonuses for the new message request; and the process passes to block 212.

Block 212 depicts a determination as to whether the priority value exceeds the priority requirement. If the priority value does not exceed the priority requirement, then the process passes to block 216. If the priority value does exceed the priority requirement, then the process passes to block 214. Block 214 illustrates outputting the new messaging request to the requested receiving according to a window treatment priority level. Next, block 216 depicts outputting an away messaging to the sending user according to the away message priority level; and the process ends.

Figure 17:
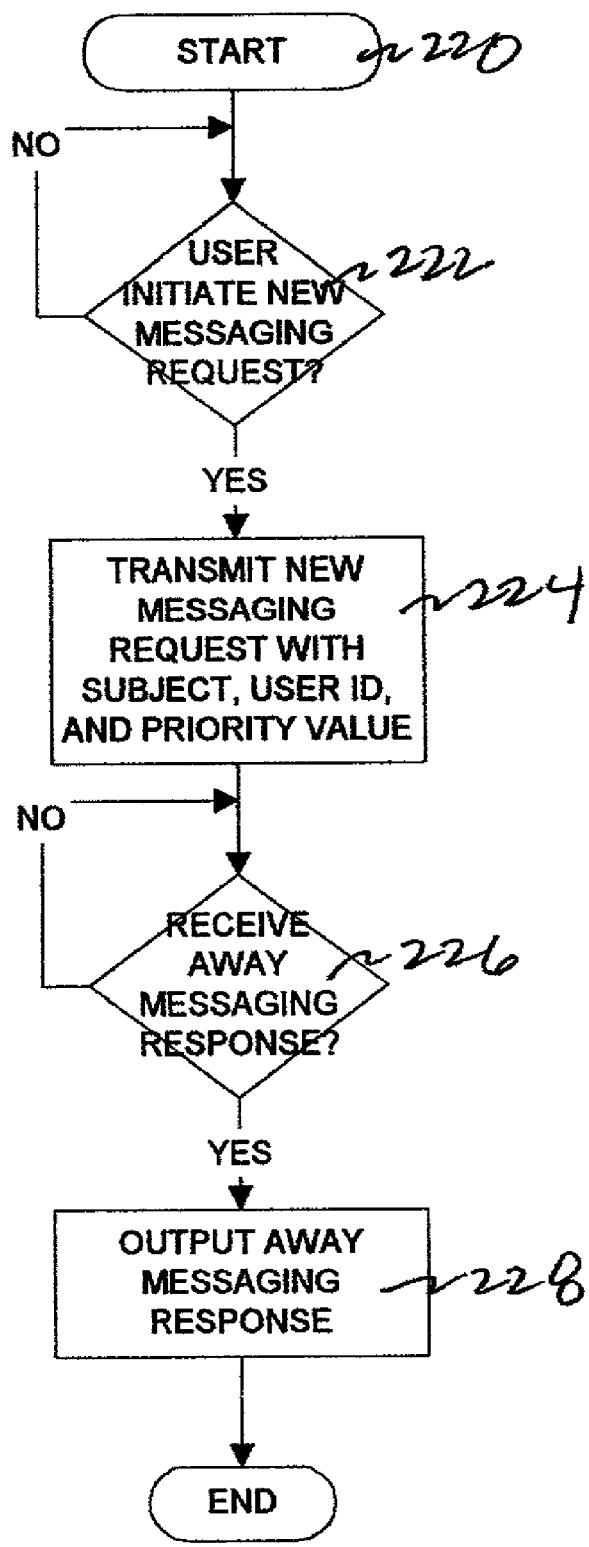
FIG. 17 depicts a high level logic flowchart of a process and program for controlling sending user requests and responses in accordance with the method, system, and program of the present invention.

With reference now to FIG. 17, there is illustrated a high level logic flowchart of a process and program for controlling sending user requests and responses in accordance with the method, system, and program of the present invention. As depicted, the process starts at block 220 and thereafter proceeds to block 222.

Block 222 illustrates a determination as to whether or not the sending user has initiated a new messaging request. If the sending user has initiated a new messaging request. If the sending user has not initiated a new messaging request, then the process iterates at block 222. If the sending user has initiated a new messaging request, then the process passes to block 224. Block 224 depicts transmitting the new messaging request with subject, user ID, and priority value, if available; and the process passes to block 226.

Block 226 depicts a determination as to whether or not an away message response is received. If an away message response is not received, then the process iterates at block 226. If an away message response is received, then the process passes to block 228. Block 228 illustrates outputting the away message response according to user preferences; and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for controlling throughput of a message request in a messaging system, said method comprising the steps of:

receiving a message request from a sending user at a messaging server facilitating a chat room between said sending user and a receiving user comprising a plurality of entries, wherein said message request comprises a request for an additional entry to said chat room, wherein said sending user assigns a priority value to said message request;

determining a priority requirement for said message request according to priority settings designated by said receiving user for whom said message request is intended;

responsive to said priority value exceeding said priority requirement, selecting a particular graphical treatment from among a plurality of separate graphical treatments each assigned a separate treatment priority setting, wherein a particular treatment priority setting for said particular graphical treatment matches said priority value;

adjusting output of said message request to said receiving user as specified by said particular graphical treatment, such that throughput of said message request to said receiving user is controlled; and responsive to said priority value not exceeding said priority requirement, blocking only said message request within said chat room, wherein only those message requests from said sending user with a priority value exceeding said priority requirement for said chat room are displayed to said receiving user.

2. The method for controlling throughput of a message request according to claim 1, said method further comprising the step of:
responsive to said priority value not exceeding said priority requirement:
selecting a particular away message from among a plurality of away messages each assigned a separate away message priority setting, wherein a particular away message priority setting for said particular away messages matches said priority value; and
sending said particular away message to said sending user client messaging system from said message server as an entry within said chat messaging session.

3. The method for controlling throughput of a messaging request according to claim 1, said method further comprising the steps of:
receiving said message request at a receiving user client messaging system communicatively connected via a network to said sending user client messaging system;
determining said priority requirement for said message request according to priority settings designated by said receiving user for whom said message request is intended at said receiving user client messaging system;
responsive to said priority value exceeding said priority requirement, selecting said particular graphical treatment at said receiving user client messaging system; and
adjusting output of said message request at said receiving user client messaging system as specified by said particular graphical treatment.

4. The method for controlling throughput of a messaging request according to claim 1, said method further comprising the steps of:
automatically specifying an away message for said sending user according to said priority requirement for said message request; and
transmitting said away message to said sending user.

5. The method for controlling throughput of a messaging request according to claim 1, said method further comprising the step of:
adjusting said priority value according to a bonus priority associated with said message request according to priority settings for said receiving user.

6. The method for controlling throughput of a messaging request according to claim 1, said method further comprising the steps of:
converting said priority value from a first scale used by said first messaging system of said sending user to a separate scale used for determining a separate value of said priority requirement; and
comparing said priority value with said priority requirement in said same separate scale to determine if said priority value exceeds said priority requirement.

7. The method for controlling throughput of a messaging request according to claim 1, said step of determining a priority requirement for said message request according to priority settings designated by a receiving user further comprising the step of:
determining a priority requirement for said messaging request according to at least one from a general priority setting, a user specified priority setting, a subject specified priority setting, and a time specified priority setting.

8. The method for controlling throughput of a messaging request according to claim 1, said step of determining a priority requirement for said message request according to priority settings designated by a receiving user further comprising the step of:
determining a priority requirement for said messaging request according to at least one scheduled event from an electronic calendar for said receiving user with a priority setting associated with said at least one scheduled event.

9. The method for controlling throughput of a messaging request according to claim 1, said step of adjusting output of said message request to said receiving user as specified by said particular graphical treatment further comprising the step of:
controlling output of said message request according to said particular graphical treatment, wherein said particular graphical treatment specifies at least one of a size of a graphical display of said message request relative to a display area, a position of a graphical display of said message request within said display area, and a selection of parts of a message request to display within said display area.

10. A system for controlling throughput of a message request in a messaging system, said system comprising:
a server system communicatively connected to a network, wherein said server system facilitates a chat room between a sending user and a receiving user comprising a plurality of entries;
said server system further comprising:
means for receiving a message request from said sending user, wherein said message request comprises a request for an additional entry to said chat room, wherein said sending user assigns a priority value to said message request;
means for determining a priority requirement for said message request according to priority settings designated by said receiving user for whom said message request is intended;
means, responsive to said priority value exceeding said priority requirement, for selecting a particular graphical treatment from among a plurality of separate graphical treatments each assigned a separate treatment priority setting, wherein a particular treatment priority setting for said particular graphical treatment matches said priority value;
means for adjusting output of said message request to said receiving user as specified by said particular graphical treatment, such that throughput of said message request to said receiving user is controlled; and
means, responsive to said priority value not exceeding said priority requirement, for blocking only said message request within said chat room, wherein only those message requests from said sending user with a priority value exceeding said priority requirement for said chat room are displayed to said receiving user.

11. The system for controlling throughput of a message request according to claim 10, wherein said server system is communicatively connected to at least one receiving user client messaging system.

12. The system for controlling throughput of a messaging request according to claim 10, said server system further comprising:

means for adjusting said priority value according to a bonus priority associated with said message request according to priority settings for said receiving user.

13. The system for controlling throughput of a messaging request according to claim 10, said server system further comprising:

means for converting said priority value from a first scale used by said first messaging system of said sending user to a separate scale used for determining a separate value of said priority requirement; and means for comparing said priority value with said priority requirement in said same separate scale to determine if said priority value exceeds said priority requirement.

14. The system for controlling throughput of a messaging request according to claim 10, said means for determining a priority requirement for said message request according to priority settings designated by a receiving user further comprising:

means for determining a priority requirement for said messaging request according to at least one from a general priority setting, a user specified priority setting, a subject specified priority setting, and a time specified priority setting.

15. The system for controlling throughput of a messaging request according to claim 10, said means for determining a priority requirement for said message request according to priority settings designated by a receiving user further comprising:

means for determining a priority requirement for said messaging request according to at least one scheduled event from an electronic calendar for said receiving user with a priority setting associated with said at least one scheduled event.

16. The system for controlling throughput of a messaging request according to claim 10, said means for adjusting output of said message request to said receiving user as specified by said particular graphical treatment further comprising:

means for controlling output of said message request according to said particular graphical treatment, wherein said particular graphical treatment specifies at least one of a size of a graphical display of said message request relative to a display area, a position of a graphical display of said message request within said display area, and a selection of parts of a message request to display within said display area.

17. The system for controlling throughput of a messaging request according to claim 10, said server system further comprising:

means for automatically specifying an away message for said sending user according to said priority requirement for said message request; and means for transmitting said away message to said sending user.

18. A program for controlling throughput of a message request in a messaging program, residing on a storable computer usable medium having computer readable program code means, said program comprising:

means for receiving a message request from a sending user at a message server facilitating a chat room between said sending user and a receiving user comprising a plurality of entries, wherein said message request comprises a request for an additional entry to said chat room, wherein said sending user assigns a priority value to said message request;

means for determining a priority requirement for said message request according to priority settings designated by said receiving user for whom said message request is intended;

means, responsive to said priority value exceeding said priority requirement, for selecting a particular graphical treatment from among a plurality of separate graphical treatments each assigned a separate treatment priority setting, wherein a particular treatment priority setting for said particular graphical treatment matches said priority value;

means for adjusting output of said message request to said receiving user as specified by said particular graphical treatment;

means, responsive to said priority value not exceeding said priority requirement, for blocking only said message request within said chat room, wherein only those message requests from said sending user with a priority value exceeding said priority requirement for said chat room are displayed to said receiving user.

19. The program for controlling throughput of a messaging request according to claim 18, said program further comprising:

means for adjusting said priority value according to a bonus priority associated with said message request according to priority settings for said receiving user.

20. The program for controlling throughput of a messaging request according to claim 18, said program further comprising:

means for converting said priority value from a first scale used by said first messaging system of said sending user to a separate scale used for determining a separate value of said priority requirement; and means for comparing said priority value with said priority requirement in said same separate scale to determine if said priority value exceeds said priority requirement.

21. The program for controlling throughput of a messaging request according to claim 18, said program further comprising:

means for determining a priority requirement for said messaging request according to at least one from a general priority setting, a user specified priority setting, a subject specified priority setting, and a time specified priority setting.

22. The program for controlling throughput of a messaging request according to claim 18, said program further comprising:

means for determining a priority requirement for said messaging request according to at least one scheduled event from an electronic calendar for said receiving user with a priority setting associated with said at least one scheduled event.

23. The program for controlling throughput of a messaging request according to claim 18, said program further comprising:

means for controlling output of said message request according to said particular graphical treatment, wherein said particular graphical treatment specifies at least one of a size of a graphical display of said message request relative to a display area, a position of a graphical display of said message request within said display area, and a selection of parts of a message request to display within said display area.

24. The program for controlling throughput of a messaging request according to claim 18, said program further comprising:

means for automatically specifying an away message for said sending user according to said priority requirement for said message request; and means for transmitting said away message to said sending user.

25. A method for controlling throughput of a message request in a messaging system, said method comprising the steps of:

receiving a message request from a sending user, wherein said sending user assigns a priority value to said message request;

determining a priority requirement for said message request according to priority settings designated by a receiving user for whom said message request is intended;

converting said priority value from a first scale used by said first messaging system of said sending user to a separate scale used for determining a separate value of said priority requirement;

comparing said priority value with said priority requirement in said same separate scale to determine if said priority value exceeds said priority requirement;

responsive to said priority value exceeding said priority requirement, selecting a particular graphical treatment from among a plurality of separate graphical treatments each assigned a separate treatment priority setting, wherein a particular treatment priority setting for said particular graphical treatment matches said priority value; and adjusting output of said message request to said receiving user as specified by said particular graphical treatment, such that throughput of said message request to said receiving user is controlled.

26. A system for controlling throughput of a message request in a messaging system, said system comprising:

a server system communicatively connected to a network;

said server system further comprising:

means for receiving a message request from a sending user, wherein said sending user assigns a priority value to said message request;

means for determining a priority requirement for said message request according to priority settings designated by a receiving user for whom said message request is intended;

means for converting said priority value from a first scale used by said first messaging system of said sending user to a separate scale used for determining a separate value of said priority requirement;

means for comparing said priority value with said priority requirement in said same separate scale to determine if said priority value exceeds said priority requirement;

means, responsive to said priority value exceeding said priority requirement, for selecting a particular graphical treatment from among a plurality of separate graphical treatments each assigned a separate treatment priority setting, wherein a particular treatment priority setting for said particular graphical treatment matches said priority value; and means for adjusting output of said message request to said receiving user as specified by said particular graphical treatment, such that throughput of said message request to said receiving user is controlled.

27. A program for controlling throughput of a message request in a messaging program, residing on a storable computer usable medium having computer readable program code means, said program comprising:

means for receiving a message request from a sending user, wherein said sending user assigns a priority value to said message request;

means for determining a priority requirement for said message request according to priority settings designated by a receiving user for whom said message request is intended;

means for converting said priority value from a first scale used by said first messaging system of said sending user to a separate scale used for determining a separate value of said priority requirement;

means for comparing said priority value with said priority requirement in said same separate scale to determine if said priority value exceeds said priority requirement;

means, responsive to said priority value exceeding said priority requirement, for selecting a particular graphical treatment from among a plurality of separate graphical treatments each assigned a separate treatment priority setting, wherein a particular treatment priority setting for said particular graphical treatment matches said priority value; and means for adjusting output of said message request to said receiving user as specified by said particular graphical treatment.

* * * * *